(12) United States Patent
Cheung et al.

(10) Patent No.: US 11,647,064 B1
(45) Date of Patent: May 9, 2023

(54) COMPUTER SYSTEMS FOR MANAGING INTERACTIVE ENHANCED COMMUNICATIONS

(71) Applicant: Remo Holdings Limited, Wan Chai (HK)

(72) Inventors: Ho Yin Cheung, Wan Chai (HK); Russell Wong Man Yung, Wan Chai (HK)

(73) Assignee: Remo Holdings Limited

( * ) Notice: Subject to any disclaimer, the term of this patent is extended or adjusted under 35 U.S.C. 154(b) by 0 days.

(21) Appl. No.: 17/506,345

(22) Filed: Oct. 20, 2021

(51) Int. Cl.
*H04L 65/403* (2022.01)
*H04L 65/75* (2022.01)
*H04N 5/262* (2006.01)
*G06V 40/16* (2022.01)
*H04W 84/12* (2009.01)

(52) U.S. Cl.
CPC .......... *H04L 65/762* (2022.05); *G06V 40/161* (2022.01); *H04L 65/403* (2013.01); *H04N 5/2628* (2013.01); *H04W 84/12* (2013.01)

(58) Field of Classification Search
CPC ....... H04L 65/60; H04L 65/403; G06V 40/16; H04N 5/262

USPC ........................................... 348/14.01–14.16
See application file for complete search history.

(56) References Cited

U.S. PATENT DOCUMENTS

| 11,307,412 | B1* | 4/2022 | Meisenholder ...... G02B 27/017 |
| 2008/0147741 | A1* | 6/2008 | Gonen ................. G06Q 10/10 |
| 2017/0244931 | A1* | 8/2017 | Faulkner ............. H04L 65/1063 |
| 2019/0355178 | A1* | 11/2019 | Hermina Martinez ...................... G06T 19/006 |
| 2021/0258511 | A1* | 8/2021 | Goodrich .............. H04L 51/046 |
| 2022/0166918 | A1* | 5/2022 | Burger ............... H04N 5/23296 |
| 2022/0174257 | A1* | 6/2022 | Bosworth ............ H04N 13/366 |

FOREIGN PATENT DOCUMENTS

EP  2525573 A1 * 11/2012 ............. H04N 7/147

* cited by examiner

*Primary Examiner* — Melur Ramakrishnaiah
(74) *Attorney, Agent, or Firm* — McCarter & English, LLP

(57) ABSTRACT

A visual enhancement engine is used to render a tile-based image generated on a user's device based on facial image movements within a video signal. The visual enhancements include orientation and size adjustments to the tile, based on a facial tracking algorithm. The enhanced image provides a more robust and realistic interactive video session in a multi-participant video conference environment.

20 Claims, 10 Drawing Sheets

COMPUTER SYSTEMS FOR MANAGING INTERACTIVE ENHANCED COMMUNICATIONS

FIELD OF INVENTION

The invention herein is directed to novel systems and methods for interactive computer operations supporting a multi-user communication platform. Specifically, the present invention is directed to a video management implementation for enhanced real time video-based group discussions.

The inventive features are particularly facilitated when implemented on an existing conferencing platform, branded remo.co. This platform is specifically designed to support both large conferences and smaller, more intimate video-based discussions that take place within the large conference. The system allows participants to move freely between subgroups to facilitate networking and interpersonal interactions.

BACKGROUND

Video conferencing has been around for several decades. In earlier iterations, video conferencing was often a one on one communication operation combining into a single signal both audio and video information between two locations. Because of the demands for bandwidth that video makes, early efforts also used compression algorithms to better squeeze the video signal into existing communication networks. The resulting conferences were stilted and awkward and far short of a face to face meeting.

As communication networks and bandwidth grew in capabilities, video conferencing expanded in kind, with multiple participants streaming video signals in real time controlled by a central server. Illustrative arrangements include the system disclosed in U.S. Pat. No. 606,306 the contents incorporated by reference as if restated in full.

While more robust, these systems continued to offer stilted and awkward interactions between participants, far short of the experience shared when talking in person.

In particular, in-person conversations include significant nonverbal information between individuals in discussion. Small head nods, leaning in or tipping in one direction or another are cues to attentiveness and acknowledgement of points arising being made—often encouraging more details or a change in topic depending on the nonverbal cues. These nonverbal elements of in-person conversations often result in a more dynamic and meaningful exchange.

In video conferencing based on platforms such as Zoom or Microsoft Teams, that provide multi-location discussions using video, web camera-based links, each participant is relegated to a small share of video screen real estate. This inhibits the communications of these nonverbal messages or cues. A screen full of like sized windows with talking heads handicaps the focus of the observer—with no meaningful guidance on who to watch in the static field for key non-verbal cues necessary for robust interpersonal communications. Some systems enlarge the window of the person talking but this is less than ideal as often it is the nonverbal cues offered by the remaining listeners that makes the discussion more dynamic.

In addressing the desire to make a more enriching and robust video conference, it was with this understanding of the problems with prior video conferencing systems that led to present invention.

SUMMARY

A novel video conferencing platform is provided with a visual enhancement layer to the images presented on screen representing participants in the conference. Each participant in the video is represented on a display screen with a window or tile. A visual enhancement engine controls the tile, its size and orientation on the display. In one implementation, the visual enhancement is based on facial tracking taken from the webcam output for a participant. Specifically, input to the visual enhancement engine facial tracking algorithm is taken from the incoming audio and video stream, generated by one of the participants.

The visual enhancement engine output is directed to the image tiles. Tile features are adjusted depending on the controlling algorithm and the incoming audio and/or video stream from the remote site. Controlling input signals can optionally include multiple audio and/or video streams from other remote participants. The facial tracking algorithm generates a control signal that modulates the tile orientation in selective ways to create an impression of an "in-person" participant by capturing and presenting key nonverbal cues.

The following presentation is made in the context of a particular web-based video conferencing platform provided by REMO.co, recognizing that the concepts here are generally applicable to multiple video platforms. In REMO.co, participants or event attendees subscribe to the service and log into the event. Based on registration requirements, upon passing system security, attendees enter a virtual event environment presented on screen. The features of the virtual environment presented to the attendees in the event are largely based on parameters selected by the event conference managers.

Upon entry into the event, all attendees are provided with connections and are immediately capable to engage in video and/or audio conferencing with all other event participants and these communications capabilities do not change during the event for each attendee. Specifically, video conferencing exists at the onset—with only the population of active video connections that change depending on the attendee's movement in the event. For example, an attendee can join a table with other attendees and thereby join the video conferencing supported discussions. In operation, the video feed from the attendee's webcam is used to provide the attendee's facial image to other attendees on screen in one tile or window and controlled by the platform. As multiple attendees aggregate at a venue, each attendee's screen is populated with multiple tiles each displaying the video feed from other attendees supporting the video conference.

In accordance with various inventive features as a first embellishment, the visual enhancement engine operates to adjust the plane each tile or window takes on the display. In this way, tiles can be tilted in multiple directions as if following a conversation from different speakers. As the tile is tilted, the image in the tile is processed to move away from a frontal view to one that appears to be viewed at more of an angle. The tilting and adjusted orientation of the face in the tile gives a three-dimensional feel to the image that is presented on screen.

In one embodiment, the tile control and image orientation output from the visual enhancement engine is the processed output from the video feed from the remote participant. Specifically, that participant's head movements—turning left or right for example—are converted into image adjustment parameters that the engine algorithm converts into corresponding tilting and image orientation for the local on-screen tile.

A further inventive aspect is directed to the application of third-party visual tracking platform with associated API that permits remote application of the processing necessary to visually enhance the remote presentation of video feeds.

Improved operation is typically provided where selection of the best and most dynamic facial tracking process and algorithm can be taken from third party commercial systems, even if not optimized for the foregoing operative objectives.

FIGURES OF DRAWINGS

FIGS. 3A, 3B, 3C, and 3D provide four screen images reflecting operation on one level of the visual enhancement engine.

Figure 4A:
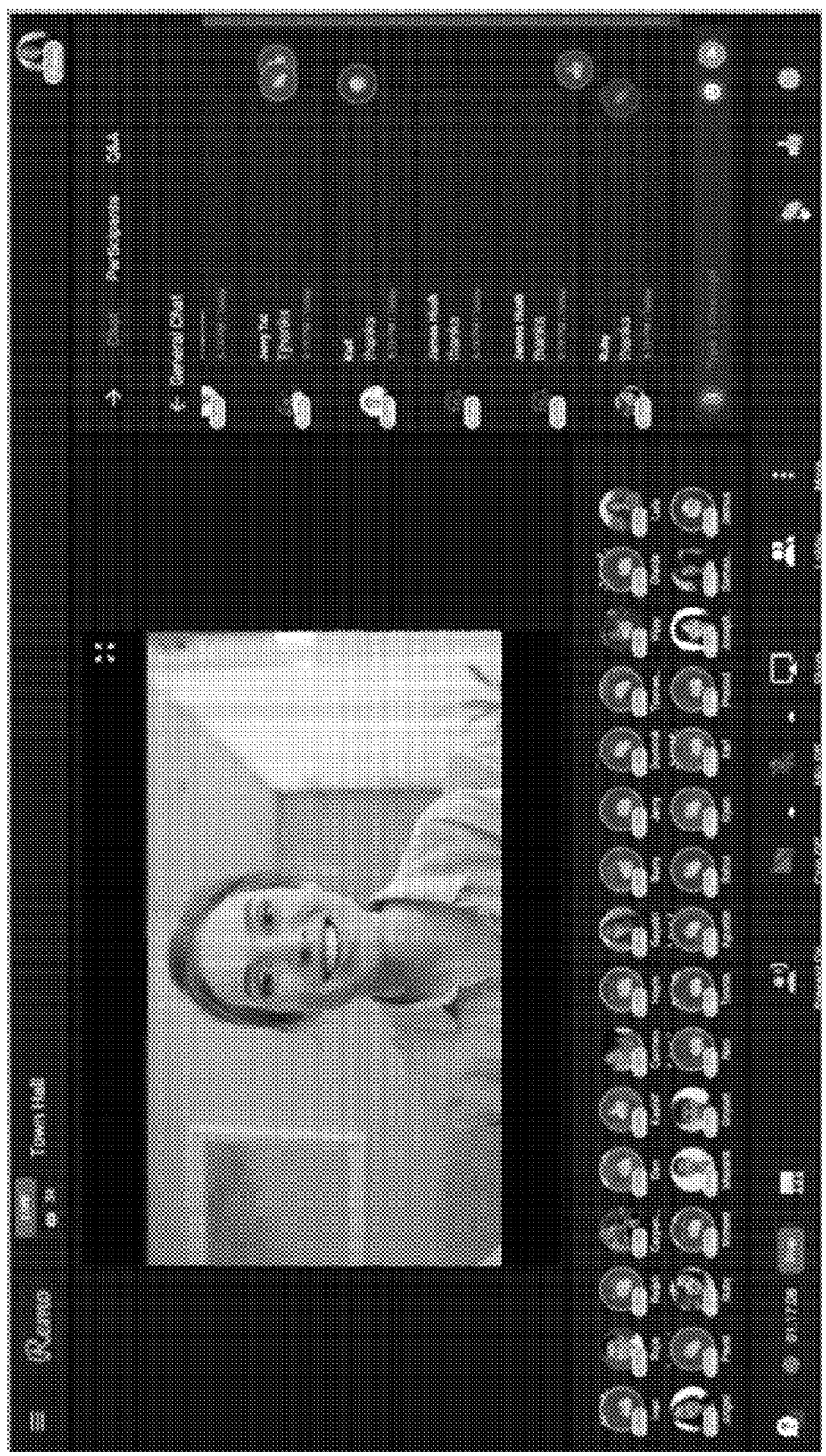
Figure 4B:
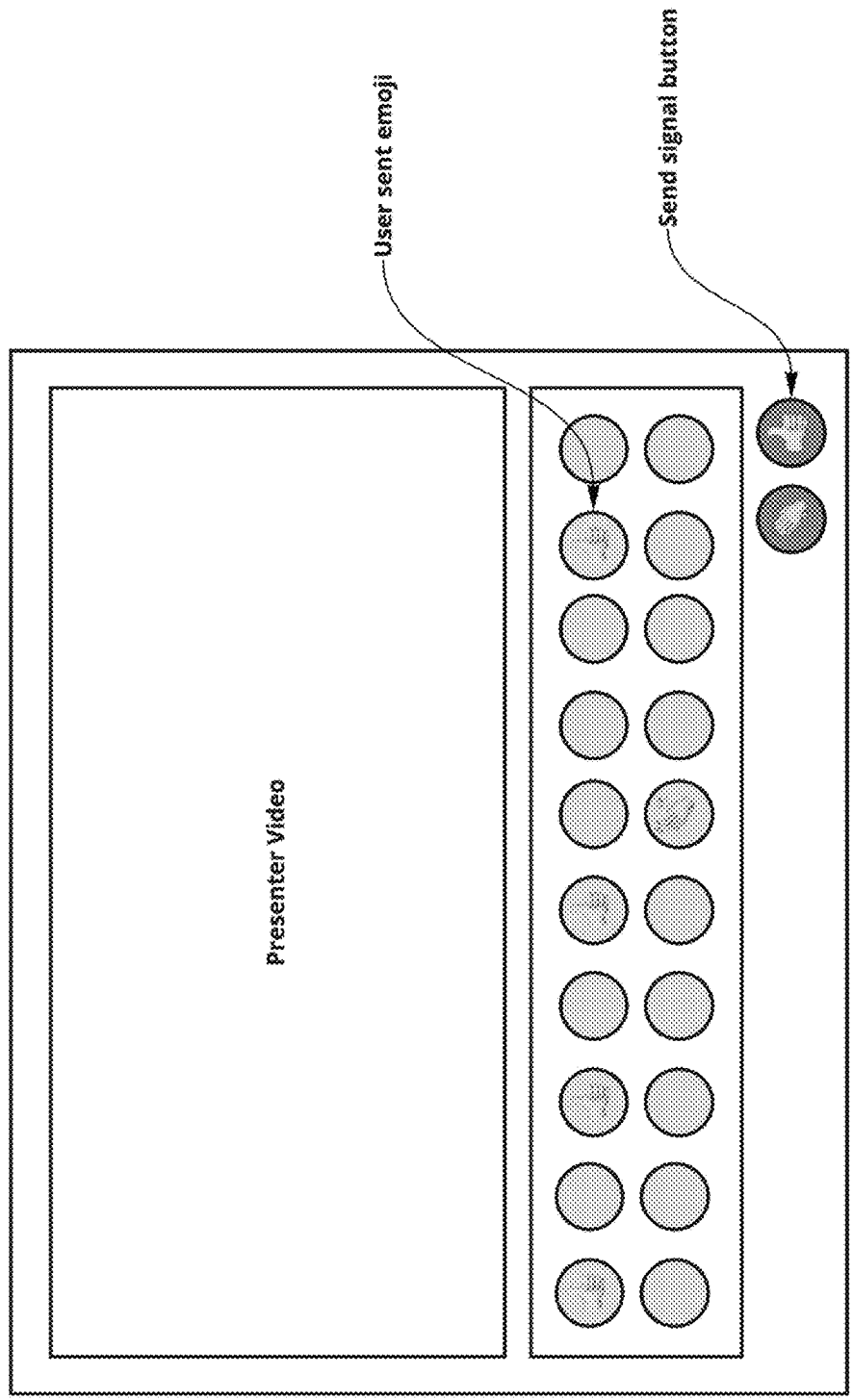
Figure 4C:
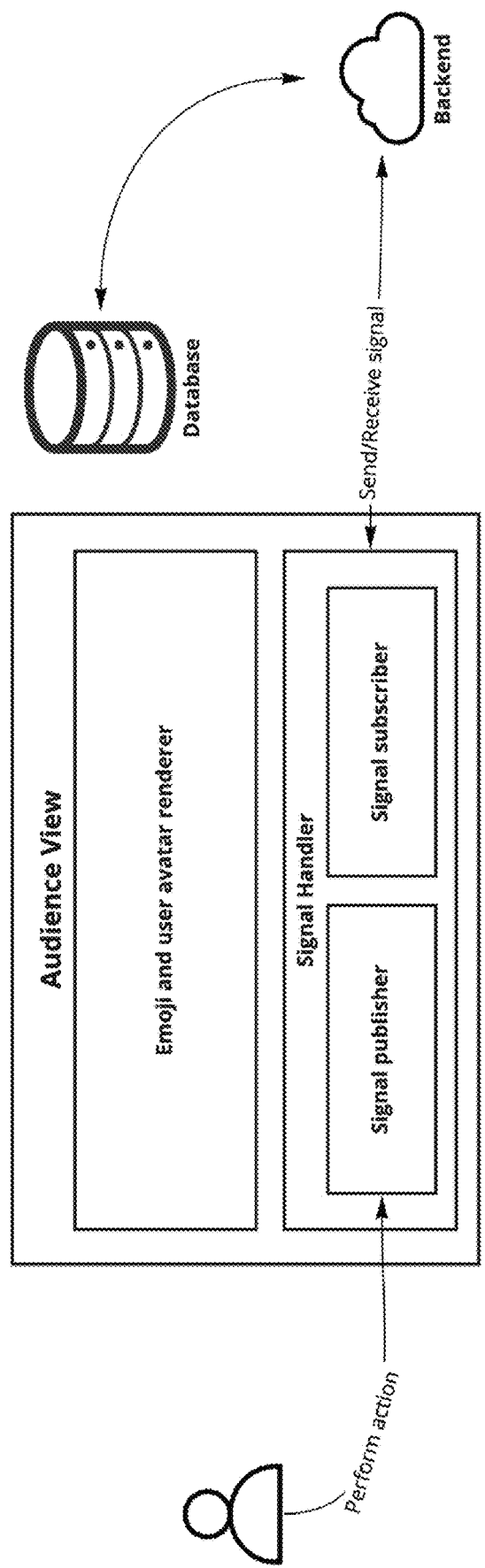

FIGS. 4A, 4B, and 4C provide a series of images depicting the presentation mode.

Figure 5:
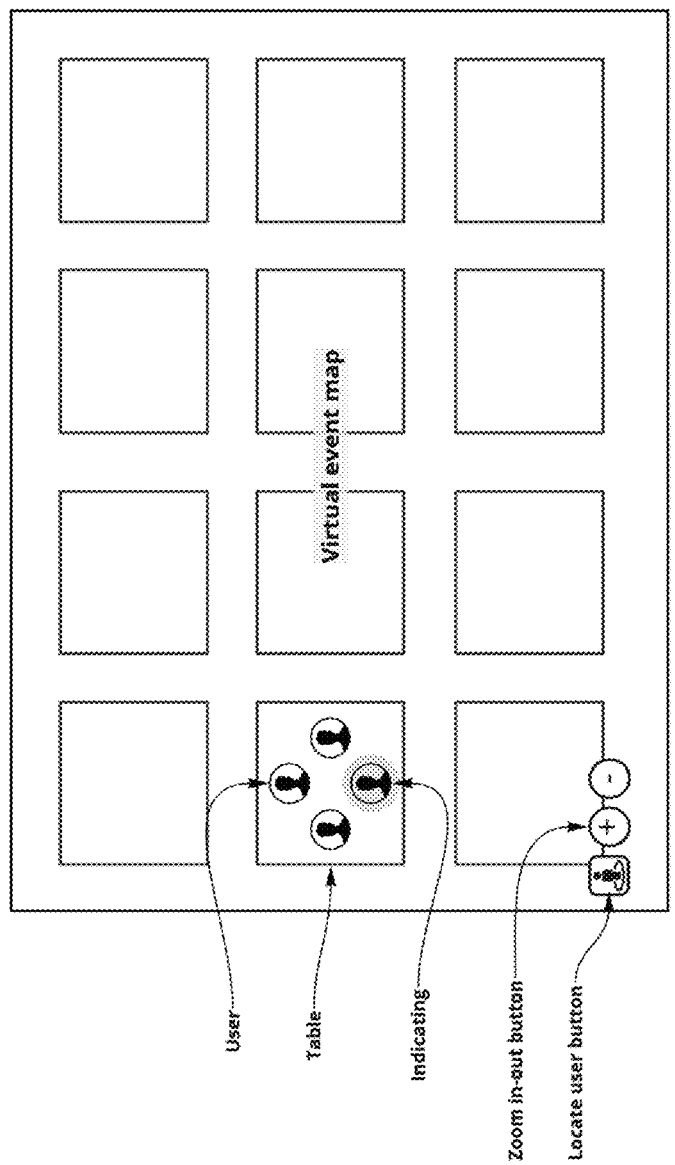

FIG. 5 provides a schematic of a navigation screen used in the present invention.

DETAILED DESCRIPTION

Briefly in overview, the inventive system is part of a video conferencing platform. An illustrative example of a platform particularly suited for implementing the operative features of the present invention. This platform is currently at www.remo.co. The Remo website supports access to the REMO video conferencing service—a service that allow multiple users to hold virtual conferences to groups with a wide range of objectives and demands. The REMO platform is subscription-based with security log-in features to control access. Event managers custom design virtual event venues. Virtual events include events of all sizes and styles, including small meetings, association conferences, virtual award dinners, and virtual trade shows. These are based on groupings of tables, chairs, podiums, conference rooms and other real-world artifacts that are used for meetings, presentations, panel discussions, and both private and public discussion sites such as an office or small kitchen/chair groupings. These virtual environmental features provide the imagery that replicates and therefore captures the unique feel of real in-person venues but in a virtual environment.

The platform is fully programmable to create specific event venues. This allows event managers to configure floor plan designs to match select branding and the particular feel and sense of the specific gathering. Because the venue is virtual, functional gathering spaces can be expressed in a variety of ways by arranging table and seating configurations, to allow, for example, 2-16 people in each subgroup. Unique environments can be created to encourage networking, workshops, conferences, among other venues that facilitate communications and indirectly online relationships that are as deep, meaningful, and enriching as relationships that develop in-person.

Depending on the configuration of the venue, participants are provided the freedom to roam and join spontaneous conversations that build long-lasting relationships. As groups become familiar with the event structure, seamless engagement becomes far more comfortable and natural for the participants. In more sophisticated designs, large virtual events can be created with multiple floors and buildings. Participants can gather at uniquely named tables within controlled access floors, and a variety of different buildings to enhance convention attributes such as breakout sessions.

A separate facility provides enhanced support for virtual presentations to an audience participating in the video conferencing. This is called the town hall facility presentation mode and replicates a presentation by a single speaker or panel—either at a podium or a panel table—with all remaining participants in the audience role. By this arrangement, the town hall metaphor is effectively established by a single large video stream from the speaker or speakers with the audience represented by smaller icons/emojis. By using this approach, crowd response can be quickly conveyed to the speakers through graphic imagery around the collective groupings within the audience.

A further capability provides a powerful navigation aid to the USER attending a large event with multiple possible tables and/or rooms. In response to an inquiry, a USER can locate his on-screen avatar quickly through a two-step process. First, the system pans and zooms in on the table or small region where the USER avatar is presently located. Second, the system triggers movement and/or lighting effects for that avatar that provides an identifier of the USER's location. In a preferred arrangement, no other video streams include this so there is no disturbance to the meeting during the tools use.

Figure 1:
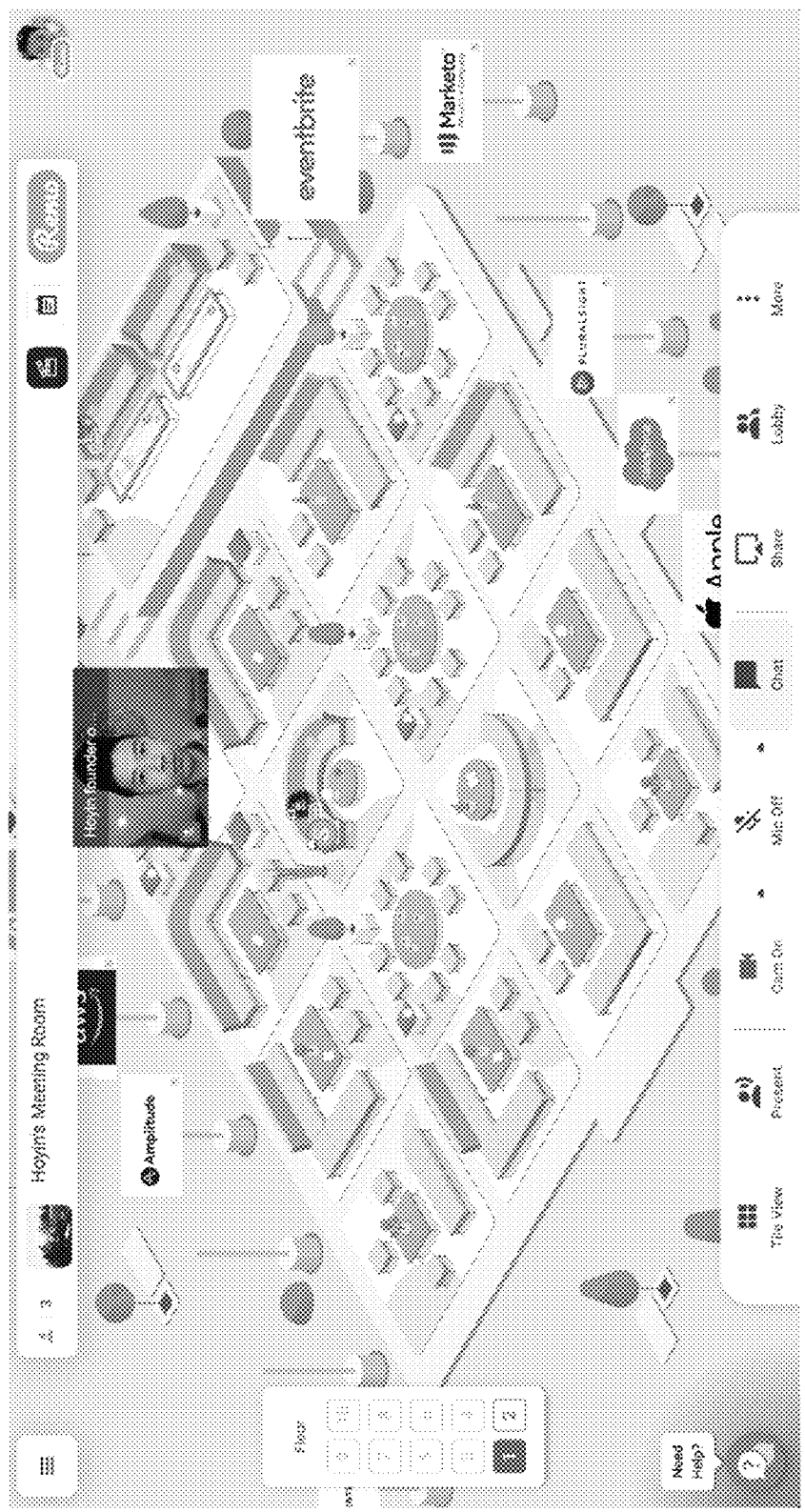
FIG. 1 is a screen image for the operative system in accordance with one specific embodiment.

Turning now to FIG. 1, an illustrative isometric view of a virtual conference is presented. The figure illustrates a single floor with multiple tables, rooms, or clusters to engage smaller groups. Avatars representing participants and hosts may be interspersed at the tables and chair groupings. In FIG. 1, two avatars are shown—sitting at a semi-circular couch in the middle of the virtual space. In this illustrative venue, the left side menu indicates that there are two accessible floors, the bottom two floors—numbered floors 1 and 2. The two floors are the only active floors for this virtual venue. The virtual space is depicted as a 4×4 grid providing 16 different rooms or tables for gathering subgroups—with various arrangements of chairs, tables and the like. Movement between the clusters can be freely open or limited by controlling access, by the system and/or organizer. Once a participant moves into a room, table, or cluster, video discussions may ensue with others within that cluster.

Next, continuing with FIG. 1 in the display located along the bottom edge, a full set of control icons allows the participant to engage in video conferencing actions. These control icons include, but are not limited to: participant view or tile view to display the video feeds of other participants; the participant locator icon, the cam on or cam off feature—enabling the user to turn on or off their video feed; the mic on or mic off feature—enabling the user to mute or unmute their audio feed; a text chat feature; a share feature—enabling a user to share a specific window or their desktop to other participants via the video feed; the lobby option; and other options.

Figure 2:
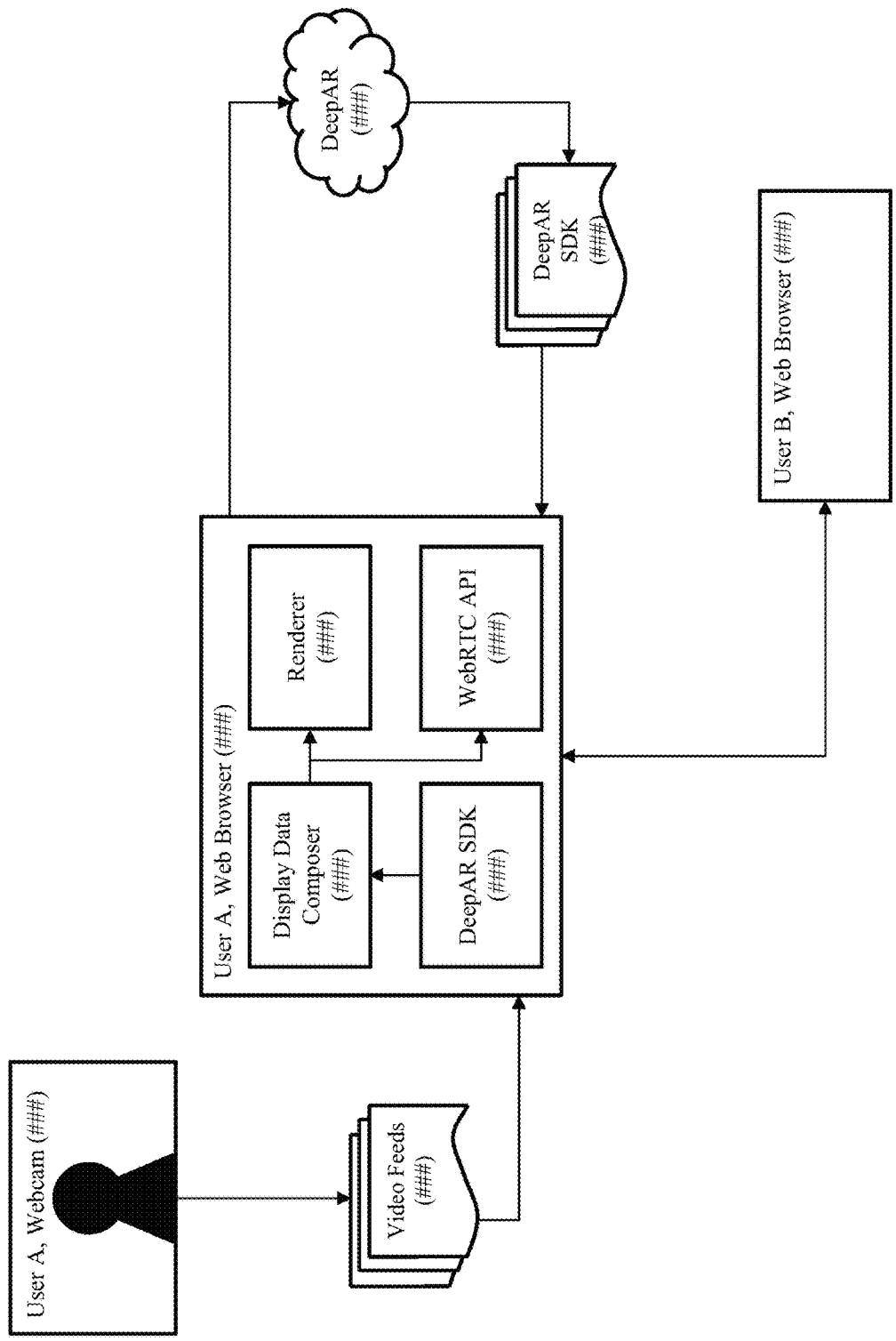
FIG. 2 is a functional block diagram for operations necessary to implement the present invention.

Now turning to FIG. 2, the figure illustrates one potential implementation of the invention. FIG. 2 illustrates the potential video and audio feeds of two users, User A and User B. User A's webcam, via User A's web browser, supplies a video feed to the platform. User A's video fees may be run through a Deep AR SDK, then a Display Data Composer, and then a Renderer or WebRTC API. Additionally, the video feed may include utilizing a DeepAR cloud feature that supplies a DeepAR SDK to User A's web browser. Following the video feed's path, the resulting video feed may be outputted to User B, through its web browser. This process may be implemented with any number of users. In a preferred arrangement, java script is downloaded from REMO website to the user browser when a venue is accessed, and a session initiated. A Software Development Kit ("SDK") is provided to uplink camera output to the DeepAR server. The DeepAR server implements the facial tracking software and provides the tile adjustments back to USER A browser for local adjustment or translation of the video window.

Now turning to FIGS. 3A, 3B, 3C, and 3D, system implement of tile movements for each video window is provided at the local web interface. Facial tracking software determines real time changes in facial orientation, such as head tipping or nodding. This creates a two-dimensional rendering that is then used to alter the tile/window delivering the video feed. Head shaking movement is converted into the horizontal skewing of the tile dimensions and movement where left and right tile boarders are enlarged and reduced to correspond to the head movement, see for example, FIGS. 3C and 3D. Similarly, head nodding is likewise converted to vertical skewing of the tile dimensions and movements of the window, thus amplifying these nonverbal cues—whether talking concurrently or not. To emphasize a point, the participant leaning into camera is converted into a larger tile, see for example, FIG. 3A. In a like process, to de-emphasize, the participant simply leans back and away from the webcam and the software converts this movement into a reduced video window size, see for example, FIG. 3B. Leaving the camera field of view closes the window.

In current implementation the REMO platform provides a local API to a third-party video/facial tracking application such as DeepAR—an AI platform that does facial tracking with video alterations in feedback, but in realtime. See www.deepar.com for more information. DeepAR is a software service that receives the video feed from the participant webcam. The facial tracking data is used by REMO system platform algorithm to modulate the video window in the group screen discussion as provided above. In a preferred arrangement, java script is downloaded from REMO website to the user browser when a venue is accessed, and a session initiated. A Software Development Kit ("SDK") is provided to uplink camera output to the DeepAR server. The DeepAR server implements the facial tracking software and provides the tile adjustments back to a single user browser for local adjustment or translation of the video signal.

The above implementation is illustrated in FIGS. 3A, 3B, 3C, and 3D. These four display screen images depict the full screen with a single tile on screen. This is for illustration purposes only as operation contemplates multiple participants with tiles arranged on screen.

Figure 3A:
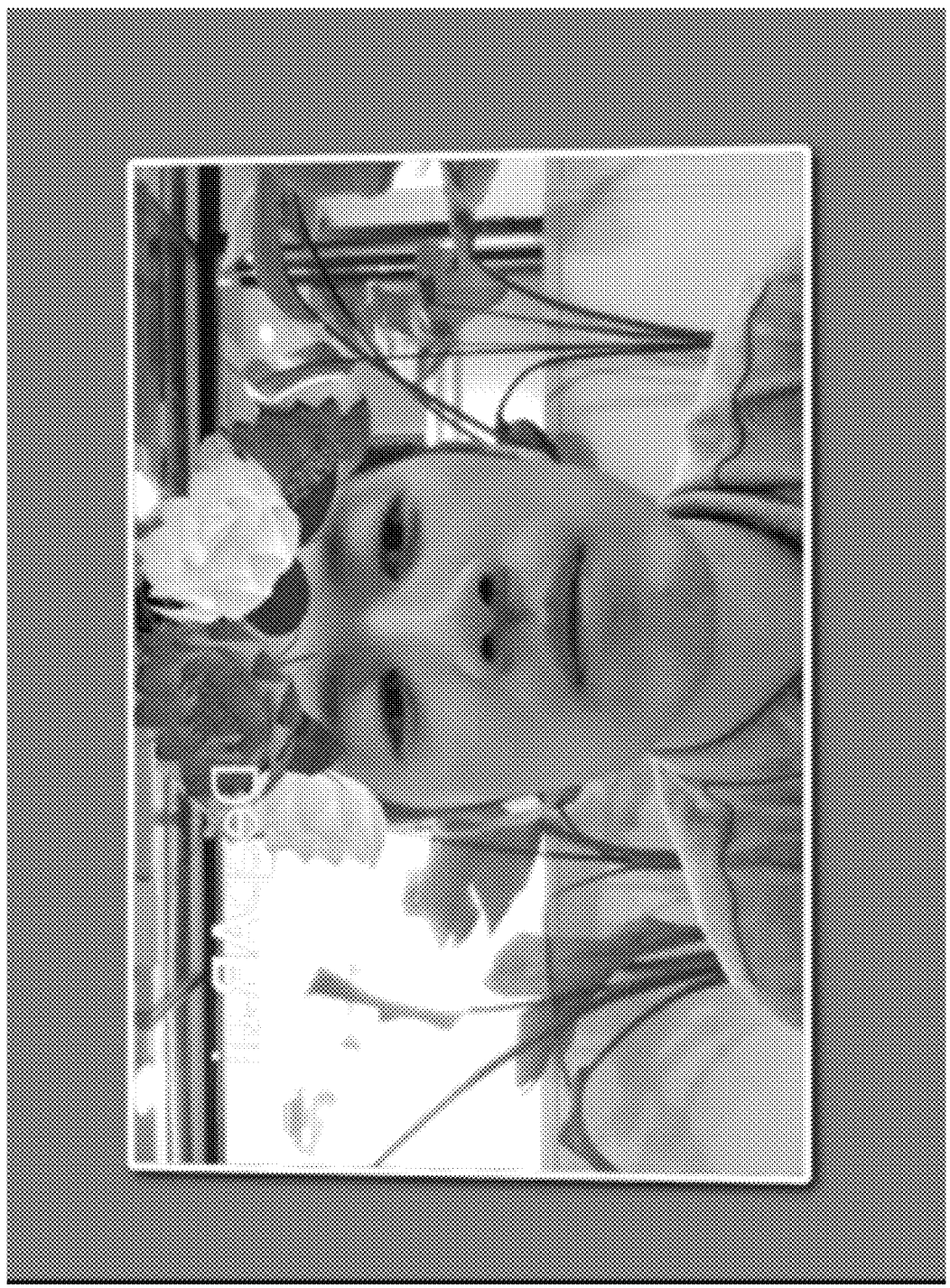
Figure 3B:

These four images are captured "stills" from a live feed, modulated by facial tracking algorithm discussed above. In FIG. 3A, a first tile modulation is made by leaning towards the webcam. In this instance, the tile boarders are expanded, and the tile now takes up more screen area than an image where the participant is located at a normal distance from the webcam. In contrast, FIG. 3B is where the participant is leaning away from the camera. Here the tile size is reduced indicating to other participants that the person in the tile is being less active in the discussion.

Figure 3C:
Figure 3D:

Turning now to FIG. 3C, the facial tracking data is now used to track head movement. In this illustration, as the participant turns to the left, the tile is modulated, and its orientation is skewed to correspond to this left angle by enlarging the left boarder and reducing the right boarder of the tile. Similarly, in FIG. 3D, the tile is modulated, with tile orientation adjusted to correspond and reflect the right turn of the participant as captured in the webcam.

Variations of this arrangement are implemented in accordance with the system parameters. In particular, facial tracking algorithms can be implemented by the platform REMO directly or supplied by one or more third party operations, such as DeepAR. There are advantages to both approaches and selection is left to the platform manager.

In addition to the above noted tile or window tilting and sizing changes, further adjustments can be theme and venue based. For example, tile adjustments can be implemented to capture venue specific lighting—offering a darker local environment with lighting to amplify a single speaker e.g., in an auditorium.

Turning to FIGS. 4A, 4B, and 4C, the presentation mode utilizing the town hall functionality is depicted. As structured and presented in FIGS. 4A and 4B, the main video output to all audience participants is presented in a large window centered above the virtual audience. As depicted, avatar remoji are floating icons on the bottom right, when you click on the remoji, an icon will show up on the right.

In the bottom right of FIGS. 4A and 4B, the screen depicts the controls for audience attendees. The selected action—clapping or thumbs up—are converted to image content for all viewers.

In FIG. 4B, the figure depicts one embodiment of an audience view. Audience view is a feature for webinar or web presentation. It is designed to improve the interaction between speaker and audiences. The steps to improve the interaction between a speaker an audiences includes: A user join an virtual event in Remo in presentation mode; the user clicking an emoji button to send the feedback; the signal is sent to backend server and broadcast to all of the connected clients; and all users in the virtual event seeing an emoji animation once the signal is received. The user interface may have two components a emoji overlay and a signal send button. The emoji overlay is an user interface component that display emotional in graph to provide feedback to speakers or other audience in the event. The signal send button is a user interface component that enable user to send the feedback to backend server and update the user's current emotional expression.

FIG. 4C, depicts one embodiment of the audience view implementation that may include a backend and database implementation and a user interface implementation. For example, Google firebase services may be used to implement the signal handling across all audiences in the presentation for the backend and database implementation. Additionally, for example, Reactjs may be used to implement the user interface to the end user. Additionally, the implementation flow may include: when a user clicks on the send signal button, a signal will be publish to backend server; the signal will be recorded in the database and propagate to other users who is attending the same presentation; the corresponding emotional feedback user interface graph will be shown to users.

Turning now to FIG. 5, a navigation tool is depicted in functional graphic terms. Specifically, location of a USER's avatar—often difficult to track in large complex meeting venues—is easily determined by a two-step process using on-screen controls. Once requested, the system pans and zooms on the region where the avatar of the USER is located. In a preferred arrangement this is zoomed to the Table level of detail on screen. Once located within a group, the second step is to highlight the avatar relative to its surroundings. This can be accomplished in a number of ways, including color or motion distinct from the surroundings.

This navigation tool may be described as the Where Am I feature. The Where am I feature is a virtual world locator. It enables the user to find himself/herself current location in the map based user interface. The steps of utilizing the Where AM I feature may include: The user joins a virtual event supported by said video conference platform in conversation mode where the user's avatar will show on a map; the user clicks the locate me button to locate himself/herself on the map; the system computes the position with respect to the map's canvas; and the system moves the viewpoint to the target area on the map canvas and plays the animation on the user avatar to indicate the position.

The Where Am I feature implementation may include a user interface. The user interface may have multiple components including a locate user button and an indication animation. The locate user button allows the user to pan and zoom the virtual map. The indication animation allows the user to visually see and become aware of the location of the user's virtual identity icon or avatar on the virtual map. The Where Am I feature user interface implementations may include Reactjs being used to implement the user interface to the end user. Additionally, the implementation flow may include: when a user clicks on the locate user button, the virtual map viewport will be panned and zoomed to the user's avatar location; and the animation will be played to indicate the user's position.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claim is:

1. A system for implementing video communications between multiple concurrent users comprising:
   a central server programmed to support video based communications between multiple remote users wherein one or more remote users communicate to said central server using a first device having a video capture component for generating a video signal wherein said first device further provides an image signal is formatted for placement into a tile sub-region of a display and visually enhanced using facial tracking software, wherein said image signal from the first device is enhanced by altering tile orientation and size in response to facial tracking data from the video signal and outputs said enhanced image signal; and
   wherein said central server controls distribution of said enhanced image signal to one or more second devices for interactive display and communication.

2. The system of claim 1 wherein said video signal from said captured video component includes facial tracking data corresponding to head tilts and nods.

3. The system of claim 1 wherein said central server provides programming to the first device to support real time alterations tracking of facial angle and proximity to said video capture component in said video signal.

4. The system of claim 3 wherein said provided programming includes an API to facilitate application of a facial tracking algorithm implemented on a server remote from said first device.

5. The system of claim 1 wherein said first device is a portable computer or cell phone.

6. The system of claim 1 wherein the central server provides an audience view and includes programming to support remote user indications in response to said first device communications.

7. The system of claim 6 wherein the central server provides programming to locate said first device user within an aggregated screen display of multiple users with information regarding this location communicated solely to said first device.

8. A first communication device comprising a video capture component, a display and microphone to support video communications with plural second devices, said first device programmed to generate image data for an image enhancing processor, wherein said processor applies a facial tracking algorithm to enhance said image data by adjusting an image tile orientation and size; said first device further comprising a receiver for receiving enhanced image data from a second device having an enhanced image generated by a facial tracking algorithm.

9. The system of claim 8 wherein said first device is a portable computer that includes a wi-fi connection to a central server.

10. The system of claim 9 wherein said first device communicates said enhanced image data to plural second devices implemented by the central server over a public access network.

11. A method for implementing video communications from multiple users comprising:
   receiving from a central server an enhanced video conference signal originating from a first device having a video capture component that generates a video signal comprising image information
   wherein said central server distributes said processed video signal to multiple users and wherein said processed video signal results from the video signal taken from the video capture component of the first device that is enhanced with a facial tracking algorithm to create said enhanced image that includes facial movements expressed as tile shape or orientation changes; and
   displaying said enhanced video signal on a display screen.

12. The method of claim 11, wherein said facial tracking algorithm detects head nodding and shaking movements.

13. The method of claim 11 wherein said facial tracking algorithm tracks the proximity of the face to the video capture component.

14. A communications network comprising one or more central servers that support interactive video communications between plural users, comprising:
   a processor for implementing a shared community with said plural users by aggregating images of said users into a single aggregate view video stream for distribution to said users;
   said processor further implementing delivery of enhanced image data from plural users where head movements are translated into orientation and size changes for one or more tiles within the single video stream;
   said processor further implementing an audience view supporting an aggregate of images with one speaker image tile being sized larger than the remaining image tiles in the aggregate view; and
   said processor further implementing a where am I algorithm to locate one user within said aggregate view with said location information communicated to that user by a single on-screen avatar associated with that user.

15. The system of claim 14 wherein said central server communicates with plural users over a public access network.

16. The system of claim 14 wherein said central server processor delivers an API to one or more users for implementing a third party facial tracking algorithm.

17. The system of claim 14 wherein said central server provides where am I programming to one or more users to implement on screen control of location services.

18. The system of claim 14 further comprising a processor for tracking account activity and securing access to user communications.

19. The system of claim 14 wherein said audience view allows audience members to react to said speaker by displaying applause or thumbs up icons.

20. The system of claim 14 wherein said video stream includes audio content from said users.

\* \* \* \* \*